Apr. 3, 1923.
W. CHILDS
1,450,484
VEHICLE WHEEL
Filed Feb. 20, 1922
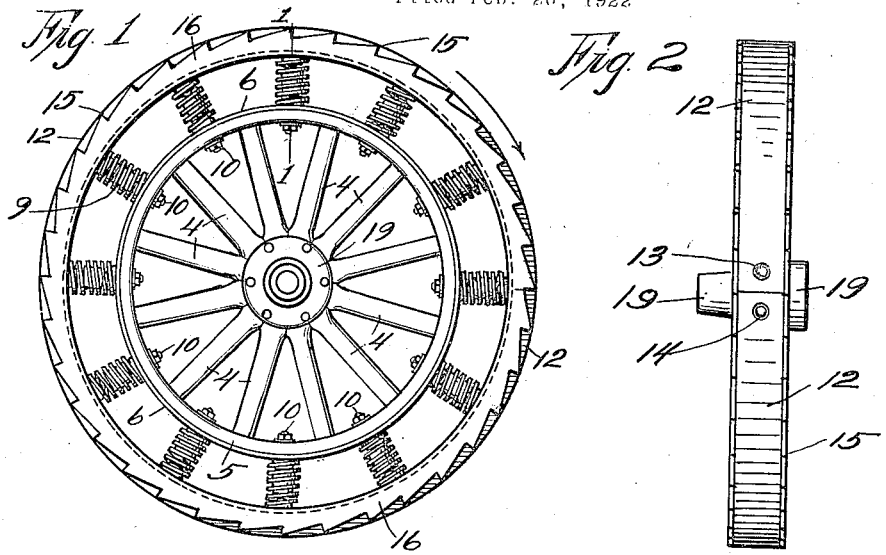
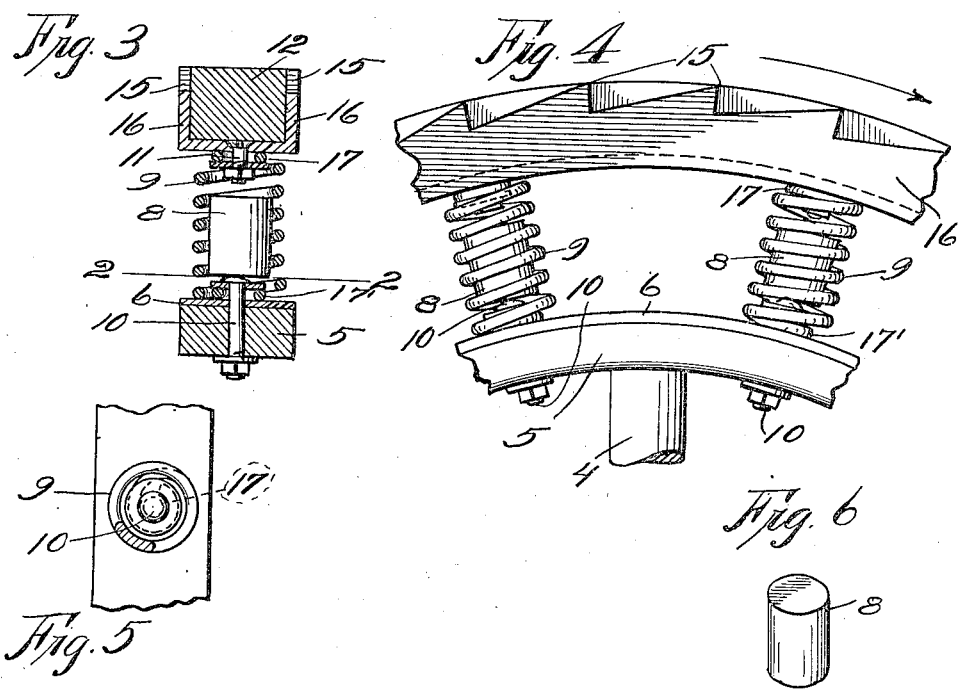
Witness:
R. E. Hamilton
Inventor:
Wallace Childs Patented Apr. 3, 1923.

1,450,484

UNITED STATES PATENT OFFICE.

WALLACE CHILDS, OF KANSAS CITY, MISSOURI.

VEHICLE WHEEL.

Application filed February 20, 1922. Serial No. 538,091.

*To all whom it may concern:*

Be it known that I, WALLACE CHILDS, a citizen of the United States, residing at Kansas City, county of Jackson and State of Missouri, have invented certain new and useful Improvements in Vehicle Wheels; and I do hereby declare the following to be a full, clear, and exact description of the invention, such as will enable others skilled in the art to which it appertains to make and use the same.

The object of my invention is to provide a rim or tire so fashioned and attached to the wheel of a buggy, wagon, truck, automobile, or similar vehicle, by means as herein shown by the drawings and hereinafter described specifically, which will render said wheel more or less as desired resilient, assist to prevent skidding of the wheel, and to make a strong, durable, and practical wheel, free from the objections of pneumatic tires and other auxiliaries of tires, now in use.

This is done by constructing a channeled tire whose rim edges are serrated and form part of the tread and by filling said channel or nearly so, with suitable plastic adhesive road material or a webbing or rubber belt filler entirely around the wheel circumferentially, so that when the wheel is in use the normal weight of the vehicle will cause the teeth to project slightly which tends to prevent skidding on icy and very slick roads and the rim teeth and the channel tread filler combine to add strength and efficiency with a minimum of metal weight and yet have a non-flexible tire.

To make the wheel resilient a series of spiral springs are used one end of each spiral spring being attached to the tire and felly or rim of a vehicle of ordinary construction or to an automobile wheel "rim" after stripping off its pneumatic tire and its accessories, and the other end of said spring attached to the metallic channeled serrated tire.

By reference to the drawings and the following specifications the invention will be set forth.

Fig. 1, is a view in elevation of my improved wheel.

Fig. 2, is an edge view of the wheel shown in Fig. 1.

Fig. 3, is a cross-section through the outer rim, resilient spoke and inner rim taken on line 1—1 of Fig. 1.

Fig. 4, is an enlarged view of a portion of the wheel shown in Fig. 1.

Fig. 5 is a plan view on line 2—2 of Fig. 3 showing the loop 17, of the spiral-spring and how it is secured thereat.

Fig. 6, is a cylindrical block of rubber used only as a bumper or buffer.

Similar numerals refer to similar parts throughout all the views.

The Fig. 1. shows an automobile, or similar wheel containing my invention in which a metal tire 16, having its channeled tread filled with suitable plastic road material, or a rubber belt as at 12, and serrations 15, formed on the edges of the sides of the channeled tire 16, surrounding the periphery of the wheel and brought together at 13, and 14, and each end of the belt bolted to the tire 16, by bolts at 13, and 14, passing through the belt 12 and tire 16 and detachably secured thereto, preferably by a nut on the bottom. The metal tire 16 may be made by moulding, pressing, or forging into the channeled serrated form shown in Figs. 1, 3, 4, and 8. Bolt holes are made through the tire 16, in the channel thereof, and the bolt 11 passed through to its head preferably counter-sunk, before the rubber belt is put on, then, the wire spiral springs 9, whose construction is shown by reference to Figs. 1, 3, and 4 is now attached at the outer end 17, to said tire; the bumper 8, of Fig. 6, may be put into place in the all-wire coiled resilient spoke, by springing back out of the way the loop 17, before bolting the said spoke to place in the wheel.

The bumper 8, is not a prerequisite for the spiral-spring's efficiency, but an auxiliary; however, I prefer its use and shape cylindrical, and its protected location within the coils of the spiral and held there by the clamping of the coils.

After all the springs are spaced about the bottom of the tire 16, and bolted thereto, the rubber belt should be placed in the tire channel and bolted as heretofore specified; the two holes for bolts at 13 and 14 may be located at any place on the circumference of the tire between the spiral-springs' bolt holes. Holes are now drilled in the rim 6, and felly 5, to correspond with the number of spiral springs to be attached thereat, then the bolt 10, see Fig. 3, is passed through a washer first, and then through the loop 17', and secured firmly by washer and nut on the threaded end of the bolt.

The spiral springs may be fastened to the rim, in any convenient and suitable manner, for some automobile wheels have no felly. The channeled tire 16, and its serrated rim edges are integral.

What I claim is:

A vehicle wheel comprising a felly, a channeled rim secured on said felly, the sides of said channel projecting outwardly and having serrations formed on their edges, and a continuous tread filler in said channel.

In testimony whereof and in the presence of two witnesses I hereby subscribe my name.

WALLACE CHILDS.

Witnesses:
S. A. MAGGIO,
GEO. A. ROBERTS.